(12) United States Patent
Davis et al.

(10) Patent No.: US 8,069,142 B2
(45) Date of Patent: Nov. 29, 2011

(54) SYSTEM AND METHOD FOR SYNCHRONIZING DATA ON A NETWORK

(75) Inventors: Marc Eliot Davis, San Francisco, CA (US); George Grinstead, Stockholm (SE); Lee J. Parry, Stockholm (SE); Marco Boerries, Los Altos Hills, CA (US); Christopher William Higgins, Portland, OR (US); Joseph James O'Sullivan, Oakland, CA (US); Ronald Martinez, San Francisco, CA (US); Robert Carter Trout, Burlingame, CA (US)

(73) Assignee: Yahoo! Inc., Sunnyvale, CA (US)

( * ) Notice: Subject to any disclaimer, the term of this patent is extended or adjusted under 35 U.S.C. 154(b) by 342 days.

(21) Appl. No.: 11/952,007

(22) Filed: Dec. 6, 2007

(65) Prior Publication Data

US 2009/0150373 A1    Jun. 11, 2009

(51) Int. Cl.
*G06F 7/00* (2006.01)
*G06F 17/00* (2006.01)

(52) U.S. Cl. ........................ 707/610; 709/225
(58) Field of Classification Search .................. None
See application file for complete search history.

(56) References Cited

U.S. PATENT DOCUMENTS

| | | | |
|---|---|---|---|
| 5,446,891 A | 8/1995 | Kaplan et al. |
| 5,493,692 A | 2/1996 | Theimer et al. |
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |

(Continued)

FOREIGN PATENT DOCUMENTS

EP    1362302    11/2003

(Continued)

OTHER PUBLICATIONS

Axup, Jeff et al., "Conceptualizing New Mobile Devices by Observing Gossip and Social Network Formation Amongst the Extremely Mobile", *ITEE Technical Report #459*, Dec. 19, 2005, pp. 1-71.

(Continued)

*Primary Examiner* — Pierre Vital
*Assistant Examiner* — Loan T Nguyen
(74) *Attorney, Agent, or Firm* — James J. DeCarlo; Greenberg Traurig, LLP

(57) ABSTRACT

The disclosure describes systems and methods for synchronizing data on a network based on temporal, spatial, social and logical data available to the network. The method includes receiving a first information object (IO) containing attributes for a first real-world entity (RWE), the first IO associated with a second RWE; identifying one or more second IOs, each second IO containing one or more attributes for the first RWE and each second IO independently associated with a third RWE; generating a different probability for each IO based on a comparison of contents of the first and second IOs and their associated RWEs; and replacing one or more of the attributes in at least one IO with at least one attribute from a different IO based on the probabilities for each IO.

12 Claims, 9 Drawing Sheets

U.S. PATENT DOCUMENTS

| | | |
|---|---|---|
| 5,835,087 A | 11/1998 | Herz et al. |
| 5,903,848 A | 5/1999 | Takahashi |
| 5,920,854 A | 7/1999 | Kirsch et al. |
| 6,014,638 A | 1/2000 | Burge et al. |
| 6,021,403 A | 2/2000 | Horvitz et al. |
| 6,047,234 A | 4/2000 | Cherveny et al. |
| 6,098,065 A | 8/2000 | Skillen et al. |
| 6,112,181 A | 8/2000 | Shear et al. |
| 6,157,924 A | 12/2000 | Austin |
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Makar et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 * | 8/2004 | Bates et al. ............ 368/10 |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez |
| 7,769,745 B2 | 8/2010 | Mor Naaman |
| 7,783,622 B1 | 8/2010 | Vandermolen et al. |
| 7,792,040 B2 | 9/2010 | Nair |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052786 A1 | 5/2002 | Kim et al. |
| 2002/0052875 A1 | 5/2002 | Smith et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abaijian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |

| | | |
|---|---|---|
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1* | 1/2005 | Wang et al. .................. 713/176 |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1* | 9/2005 | Appelman et al. .............. 705/1 |
| 2005/0219375 A1 | 10/2005 | Hasegawa et al. |
| 2005/0234781 A1 | 10/2005 | Morgenstern |
| 2005/0273510 A1* | 12/2005 | Schuh .......................... 709/225 |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1* | 9/2006 | Savilampi ........................ 705/8 |
| 2006/0212401 A1 | 9/2006 | Ameerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1* | 12/2007 | Alexander et al. ................ 705/8 |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0154720 A1 | 6/2008 | Gounares |
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0270579 A1 | 10/2008 | Herz et al. |
| 2008/0285886 A1 | 11/2008 | Allen |
| 2008/0300250 A1 | 12/2008 | Hardy et al. |
| 2008/0320001 A1 | 12/2008 | Gaddam |

| | | | |
|---|---|---|---|
| 2009/0005987 A1 | 1/2009 | Vengroff et al. | |
| 2009/0006336 A1 | 1/2009 | Forstall et al. | |
| 2009/0012934 A1 | 1/2009 | Yerigan | |
| 2009/0012965 A1 | 1/2009 | Franken | |
| 2009/0043844 A1 | 2/2009 | Zimmet et al. | |
| 2009/0044132 A1 | 2/2009 | Combel et al. | |
| 2009/0063254 A1 | 3/2009 | Paul et al. | |
| 2009/0070186 A1 | 3/2009 | Buiten et al. | |
| 2009/0073191 A1 | 3/2009 | Smith et al. | |
| 2009/0076889 A1 | 3/2009 | Jhanji | |
| 2009/0100052 A1 | 4/2009 | Stern et al. | |
| 2009/0106356 A1 | 4/2009 | Brase et al. | |
| 2009/0125517 A1 | 5/2009 | Krishnaswamy et al. | |
| 2009/0132941 A1 | 5/2009 | Pilskalns et al. | |
| 2009/0144141 A1 | 6/2009 | Dominowska et al. | |
| 2009/0150501 A1 | 6/2009 | Davis et al. | |
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1 | 8/2009 | Coffman et al. | |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1 | 9/2009 | Strandeil et al. | |
| 2009/0249482 A1 | 10/2009 | Sarathy | |
| 2009/0265431 A1 | 10/2009 | Jania et al. | |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0118025 A1 | 5/2010 | Smith et al. | |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |

FOREIGN PATENT DOCUMENTS

| | | |
|---|---|---|
| JP | 2002312559 | 10/2002 |
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

Conhaim, Wallys W., "Social networks: the Internet continues to evolve: where is the money in all this? That is what venture capitalists are asking. (Perspectives)", *Information Today*, 22, 9, 35(2), Oct. 2005, (pp. 1-5 of attached).
Davis, Marc et al., "From Context to Content: Leveraging Context to Infer Media Metadata", *ACM Press*, Oct. 10, 2004, pp. 1-8.
Kaasinen, E., "Behaviour & Information Technology", *Taylor & Francis*, vol. 24, No. 1, Jan./Feb. 2005, pp. 37-49, (Abstract only attached).
Konomi, Shin'ichi et al., "Supporting Colocated Interactions Using RFID and Social Network Displays", *Pervasive Computing*, Jul.-Sep. 2006, vol. 5, No. 3, pp. 48-56 (pp. 1-4 of attached).
Lin, F. et al., "A unified framework for managing Web-based services.", *Information Systems and e-Business Management*, vol. 3, Oct. 2005, p. 299, (pp. 1-15 of attached).
Metz, Cade, "MySpace Nation", *PC Magazine*, Jun. 21, 2006, pp. 1-10 attached.
Perkowitz, Mike et al., "Utilizing Online Communities to Facilitate Physical World Interactions", *The International Conference on Communities and Technologies*, Sep. 19, 2003, Amsterdam, pp. 1-6.
Roush, Wade, "Social Machines", *Continuous Computing Blog*, Jul. 5, 2005, pp. 1-21.
Roush, Wade, "Social Machines", *Technology Review*, Aug. 2005, pp. 45-51.
Sheppard, Brett, "The Rights Stuff: The Integration of Enterprise Digital Rights Management Into an Enterprise Architecture", *EContent*, vol. 29, No. 9, Nov. 2006, p. 38, 40-44, (pp. 1-7 of attached).
Voight, Joan et al., "Lessons for Today's Digital Market", ADWEEK. COM, Oct. 2, 2006, pp. 1-6.
"Companies add new communication features to photo sharing.", *Digital Imaging Digest*, Feb. 2006, pp. 1-2.
"DAVE.TV and Eye Music Network Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", *Screen Digest*, No. 420, p. 305, Sep. 2006, (pp. 1-9 of attached).
"Emerging Markets: What media 2.0 can offer advertisers.", *Campaign*, Oct. 27, 2006, p. 26, (pp. 1-5 of attached).
"Reality Digital Debuts Opus", www.lightreading.com, Sep. 25, 2006, pp. 1.
Almieda, R.B. et al. "A Community-Aware Search Engine," WWW2004, New York., NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceeding of the 2000 Conference on Intelligent User Interfaces, eight pages.
Finkelstein, L. et al. (2001). "Placing Search in Context: The Concept Revisited," WWW/O, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artificial Intelligence, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032__40_agents&ubicomp/remembrance-agent . . . >, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.

Written Opinion PCT/US2008/088228 dated Sep. 30, 2009—5 pages.
U.S. Appl. No. 12/273,259, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/953,454, filed Dec. 10, 2007, Davis.
U.S. Appl. No. 11/953,494, filed Dec. 10, 2007, Davis.
U.S. Appl. No. 12/236,668, filed Sep. 24, 2008, Davis.
U.S. Appl. No. 12/059,594, filed Mar. 31, 2008, Martinez.
U.S. Appl. No. 12/057,878, filed Mar. 28, 2008, Martinez.
U.S. Appl. No. 12/057,943, filed Mar. 28, 2008, Martinez.
U.S. Appl. No. 11/969,751, filed Jan. 4, 2008, Martinez.
U.S. Appl. No. 12/145,145, filed Jun. 24, 2009, Davis.
U.S. Appl. No. 12/163,249, filed Jun. 27, 2008, Kalaboukis.
U.S. Appl. No. 12/182,969, filed Jul. 30, 2008, Higgins.
U.S. Appl. No. 12/182,813, filed Jul. 30, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shinichi et al., "Supporting Colocated Interactions Using RFID and Social Network Displays", Pervasive Computing, Jul.-Sep. 2006 , vol. 5, No. 3, pp. 48-56 (pp. 1-4 of attached).
Lin, F. et al., "A unified framework for managing Web-based services. ", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.
"Companies add new communication features to photo sharing.", Digital Imaging Digest, Feb. 2006, pp. 1-2.
"DAVE.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Nedos, A; Singh K., Clarke S, Proximity Based Group Communications for Mobile AD HOC Networks'; Proximity-Based Group Communication; Global Smart Spaces; D.14; Oct. 3, 2003; 31 pages.
Brunato, M; Battiti R. "Pilgrim: A Location Broker and Mobility-Aware Recommendation System"; Technical report DIT-02-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
U.S. Appl. No. 11/593,668, filed Nov. 6, 2006 for Naaman, et al.
U.S. Appl. No. 11/593,869, filed Nov. 6, 2006 for Naaman, et al.
"Gutenkarte" Book Catalog, 2006 MetaCarta, Inc., www.gutenkarte.org 11pgs.
Baron, N.S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h >..., last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.

Wooldridge, M. et al. (2005). "STALK. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.
Anonymous. (Date Unknown). "Google Earth User Guide—Using Image Overlays and 3D Models," located at <http://earth.google.com/userguide/v4/ug_imageoverlays.html >, nine pages.
Anonymous. (Date Unknown). "Google Maps," located at <http://en.wikipedia.org/wiki/Google_maps >, last visited on Feb. 27, 2008, eleven pages.
Anonymous. (Date Unknown). "Live Search Maps," located at <http://en.wikipedia.org/wiki/Windows_live_maps >, last visited on Mar. 3, 2008, six pages.
Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.
Anonymous. (2007). "Wayfaring Follow You, Follow Me," located at <http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous. (2008). "Wikimpaia.org ," located at <http://wikimpaia.org/>, last visited on Mar. 3, 2008, one page.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 9, 2006, Jaffe.
U.S. Appl. No. 11/593,869, filed Nov. 6, 2006, Mor Naaman.
U.S. Appl. No. 11/593,668, filed Nov. 6, 2006, Mor Naaman.
Allen James F., "Maintaining Knowledge About Temporal Intervals", Communications of the ACM, Nov. 1983, vol. 26, No. 11 pp. 832-843; 12 pages.
Press Release, "QUALCOMM Conducts First Live Demonstration of FL Technology on a Wireless Handset", Qualcomm Inc., San Diego, Sep. 27, 2005; 3 pages.
MediaFlo, FLO Technology Overview, Qualcomm Inc. Copyright 2007; 24 pages.
Konomi, Shin'ichi et al., "Supporting Colocated Interactions Using RFID and Social Network Displays", Pervasive Computing, Jul.-Sep. 2006 , vol. 5, No. 3, pp. 48-56 (pp. 1-4 of attached).
Notification of Transmittal of The International Search Report and The Written Opinion of The International Search Authority, or Declaration (PCT/US2007/084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.
Rekimoto, et al., "CyberCode: designing augmented reality environments with visual tags. "Proceedings of DARE 2000 on Designing augmented reality environments, Elsinore, Denmark, pp. 1-11 Apr. 12-14, 2000.

"Semacode-URL Barcodes-practical ubiquitous computing", located at http://semacode.org visited on Apr. 13, 2007; 3 pages.
"Technical White Paper: Choosing the best 2D barcode format for mobile apps, "Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification."10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&lr=&9=cache:vbwslsm1CisJ:www.openu . acil/Personal_sites/tarnirtassa/Publications/hcm.pdf+goldberger+clustering+method+hungarian> visited on Mar. 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In on the Move to Meaningful Internet Systems 2003: Coop/S, DOA, and ODBASE R. Meersman et al. eds., pp. 196-217.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.
Nair, R. et al. (Nov. 6-11, 2005). "Photo L01: Browsing Multi-User Photo Collections," MM'05 Singapore, pp. 223-224.
0' Hare, N. et al. "Combination of Content Analysis and Context Features for Digital Photograph Retrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarvas, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM '03'Berkeley: California. 12 pages.
U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.

U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054, filed Mar. 3, 2008; 64 pgs.
U.S. Appl. No. 12/041,062, filed Mar. 3, 2008; 66 pgs.
U.S. Appl. No. 12/041,088, filed Mar. 3, 2008; 66 pgs.
U.S. Appl. No. 12/169,931, filed Jul. 9, 2008; 66 pgs.
U.S. Appl. No. 12/170,025, filed Jul. 9, 2008; 67 pgs.
U.S. Appl. No. 12/180,499, filed Jul. 25, 2008; 67 pgs.
U.S. Appl. No. 12/180,486, filed Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.

\* cited by examiner

SYSTEM AND METHOD FOR SYNCHRONIZING DATA ON A NETWORK

BACKGROUND

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information may be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY

This disclosure describes systems and methods for using data collected and stored by multiple devices on a network in order to improve the performance of the services provided via the network. In particular, the disclosure describes systems and methods for synchronizing data on a network based on temporal, spatial, social and logical data available to the network. The method includes receiving a first information object (IO) containing attributes (such as name, telephone number, address, etc.) for a first real-world entity (RWE) such as a person, place or thing. The first IO, which may be virtual card or contact information, is owned by and therefore associated with a second RWE. One or more second IOs are then identified in which each second IO contains one or more attributes for the first RWE and each second IO is independently owned by/associated with a third RWE. The method generates a different probability for each IO based on a comparison of contents of the first and second IOs and information known about their associated RWEs. The method then replaces one or more of the attributes in at least one IO with at least one attribute from a different IO based on the probabilities for each IO, thereby automatically synchronizing data between different IOs owned by different users on the network without any user input.

In another aspect, the disclosure describes a computer-readable medium encoding instructions for performing a method for automatically correcting contact attributes associated with a user. The method includes receiving a first contact object (CO), such as for example a virtual card or contact entry in an electronic address book, containing contact attributes for a first user, the first CO under the control of an owner. The method also includes identifying one or more second COs, each second CO containing one or more contact attributes for the first user and independently controlled by a third-party user different from the owner and generating a probability for each CO based on contents of the first and second COs and weights associated with their controlling owner or third-party user. The method further includes changing at least one attribute in at least one CO based on the generated probabilities for the COs.

In yet another aspect, the disclosure describes a system that synchronizes data which includes a correlation engine connected via at least one communication network to a plurality of computing devices including a first device controlled by a first user and a second device controlled by a second user. The correlation engine, based on the detection of revised data received from the first computing device, identifies an IO on the second computing device containing old data inconsistent with the revised data and transmits the revised data to the second device. In addition, the correlation engine identifies the IO based on a relationship between the first user and the second user determined from an analysis of previous interactions of one or more devices controlled by the first user including the first device, one or more devices controlled by the second user including the second computing device, and at least one device controlled by a third user different from the first user and the second user.

In yet another aspect, the disclosure describes a memory for storing data for access by an application program being executed on a data processing system, such as memory in a computing device. The memory includes a contact IO, such as a virtual card, database record, or set of contact data, stored in said memory, in which the contact IO contains a user name and a unique identifier of a user on a data synchronization network. The contact IO further includes at least one contact attribute usable by an associated communication network for contacting a device and, associated with each contact attribute, a unique identifier for the device on the data synchronization network. For example, at least one contact attribute may be a telephone number for a cellular phone and its associated unique identifier identifies the cellular phone to the data synchronization network. As another example, at least one contact attribute may define a physical location (e.g., by a defined set of spatial coordinates) and its associated unique identifier identifies the physical location to the data synchronization network.

In yet another aspect, the disclosure describes a method for synchronizing data that includes identifying relationships between physical entities known to a synchronization network and, based on the identified relationships, selectively synchronizing data associated with some of the physical entities.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the disclosure in any manner, which scope shall be based on the claims appended hereto.

DETAILED DESCRIPTION

Figure 1:
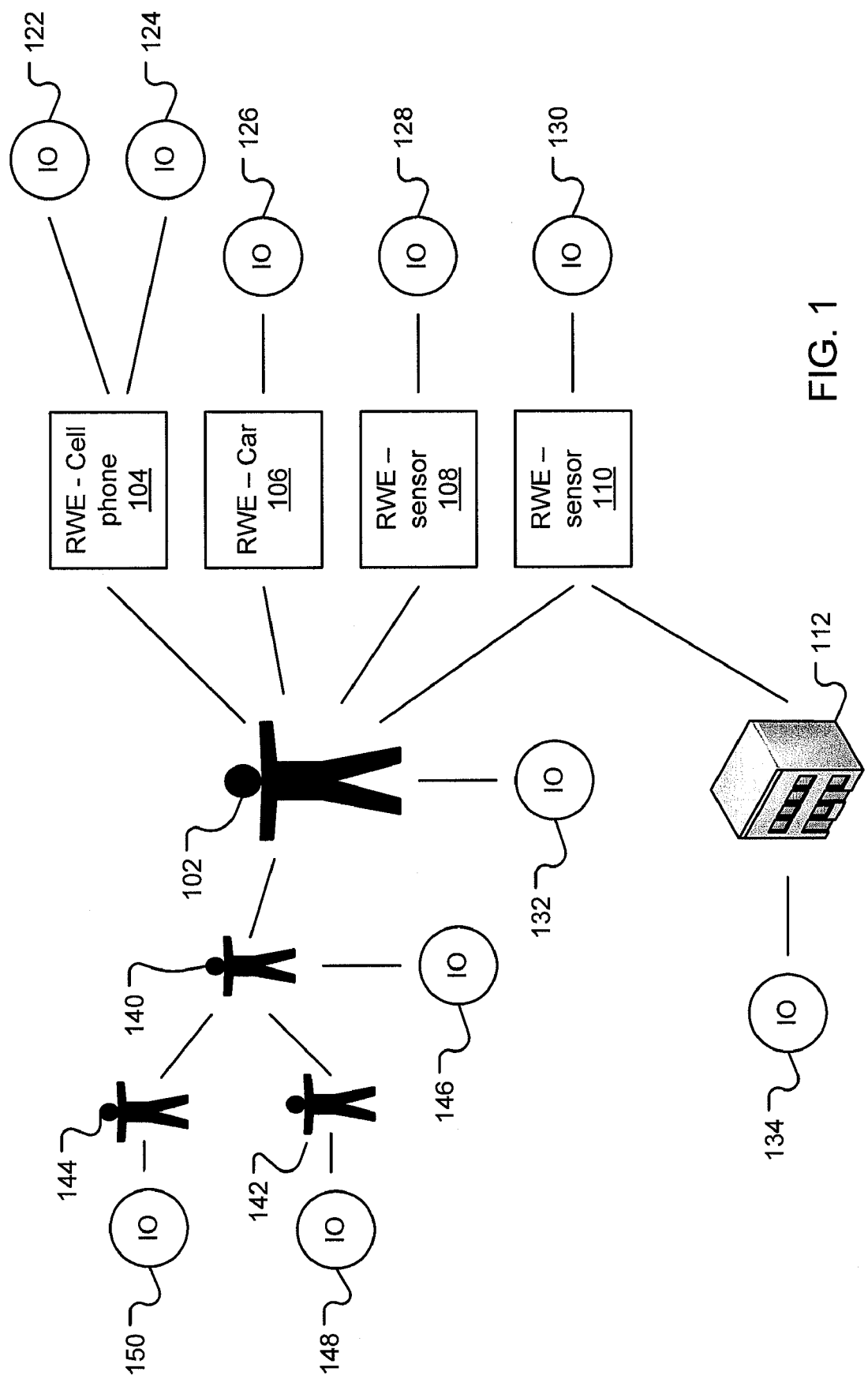
FIG. 1 illustrates an example of the relationships between RWEs and IOs on the W4 COMN.

This disclosure describes a communication network, referred herein as the "W4 Communications Network" or W4 COMN, that uses information related to the "Who, What, When and Where" of interactions with the network to provide improved services to the network's users. The W4 COMN is a collection of users, devices and processes that foster both synchronous and asynchronous communications between users and their proxies. It includes an instrumented network of sensors providing data recognition and collection in real-world environments about any subject, location, user or combination thereof.

As a communication network, the W4 COMN handles the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

The W4 COMN uses a data modeling strategy for creating profiles for not only users and locations but also any device on the network and any kind of user-defined data with user-specified conditions from a rich set of possibilities. Using Social, Spatial, Temporal and Logical data available about a specific user, topic or logical data object, every entity known to the W4 COMN can be mapped and represented against all other known entities and data objects in order to create both a micro graph for every entity as well as a global graph that interrelates all known entities against each other and their attributed relations.

In order to describe the operation of the W4 COMN, two elements upon which the W4 COMN is built must first be introduced, real-world entities and information objects. These distinction are made in order to enable correlations to be made from which relationships between electronic/logical objects and real objects can be determined. A real-world entity (RWE) refers to a person, device, location, or other physical thing known to the W4 COMN. Each RWE known to the W4 COMN is assigned or otherwise provided with a unique W4 identification number that absolutely identifies the RWE within the W4 COMN.

RWEs may interact with the network directly or through proxies, which may themselves be RWEs. Examples of RWEs that interact directly with the W4 COMN include any device such as a sensor, motor, or other piece of hardware that connects to the W4 COMN in order to receive or transmit data or control signals. Because the W4 COMN can be adapted to use any and all types of data communication, the devices that may be RWEs include all devices that can serve as network nodes or generate, request and/or consume data in a networked environment or that can be controlled via the network. Such devices include any kind of "dumb" device purpose-designed to interact with a network (e.g., cell phones, cable television set top boxes, fax machines, telephones, and radio frequency identification (RFID) tags, sensors, etc.). Typically, such devices are primarily hardware and their operations can not be considered separately from the physical device.

Examples of RWEs that must use proxies to interact with W4 COMN network include all non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) are also considered RWEs that must use proxies to interact with the network. Smart devices are electronic devices that can execute software via an internal processor in order to interact with a network. For smart devices, it is actually the executing software application(s) that interact with the W4 COMN and serve as the devices' proxies.

The W4 COMN allows associations between RWEs to be determined and tracked. For example, a given user (an RWE) may be associated with any number and type of other RWEs including other people, cell phones, smart credit cards, personal data assistants, email and other communication service accounts, networked computers, smart appliances, set top boxes and receivers for cable television and other media services, and any other networked device. This association may be made explicitly by the user, such as when the RWE is installed into the W4 COMN. An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association may include the user identifying a specific relationship between the user and the RWE (e.g., this is my device, this is my home appliance, this person is my friend/father/son/etc., this device is shared between me and other users, etc.). RWEs may also be implicitly associated with a user based on a current situation. For example, a weather sensor on the W4 COMN may be implicitly associated with a user based on information indicating that the user lives or is passing near the sensor's location.

An information object (IO), on the other hand, is a logical object that stores, maintains, generates, serves as a source for or otherwise provides data for use by RWEs and/or the W4 COMN. IOs are distinct from RWEs in that IOs represent data, whereas RWEs may create or consume data (often by creating or consuming IOs) during their interaction with the W4 COMN. Examples of IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that may further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In addition, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs may or may not serve as a proxy for one or more RWEs. For example, voice communication software on a smart phone may serve as the proxy for both the smart phone and for the owner of the smart phone.

An IO in the W4 COMN may be provided a unique W4 identification number that absolutely identifies the IO within the W4 COMN. Although data in an IO may be revised by the act of an RWE, the IO remains a passive, logical data representation or data source and, thus, is not an RWE.

For every IO there are at least three classes of associated RWEs. The first is the RWE who owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs who then pay any attention (directly or through a proxy process) to the IO, in which "paying attention" refers to accessing the IO in order to obtain data from the IO for some purpose.

"Available data" and "W4 data" means data that exists in an IO in some form somewhere or data that can be collected as needed from a known IO or RWE such as a deployed sensor. "Sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates an example of the relationships between RWEs and IOs on the W4 COMN. In the embodiment illustrated, a user 102 is a RWE of the network provided with a unique network ID. The user 102 is a human that communicates with the network via the proxy devices 104, 106, 108, 110 associated with the user 102, all of which are RWEs of the network and provided with their own unique network ID. Some of these proxies may communicate directly with the W4 COMN or may communicate with the W4 COMN via IOs such as applications executed on or by the device.

As mentioned above the proxy devices 104, 106, 108, 110 may be explicitly associated with the user 102. For example, one device 104 may be a smart phone connected by a cellular service provider to the network and another device 106 may be a smart vehicle that is connected to the network. Other devices may be implicitly associated with the user 102. For example, one device 108 may be a "dumb" weather sensor at a location matching the current location of the user's cell phone 104, and thus implicitly associated with the user 102 while the two RWEs 104, 108 are co-located. Another implicitly associated device 110 may be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 may also be directly associated with other people, such as the person 140 shown, and then indirectly associated with other people 142, 144 through their associations as shown. Again, such associations may be explicit (e.g., the user 102 may have identified the associated person 140 as his/her father, or may have identified the person 140 as a member of the user's social network) or implicit (e.g., they share the same address).

Tracking the associations between people (and other RWEs as well) allows the creation of the concept of "intimacy": Intimacy being a measure of the degree of association between two people or RWEs. For example, each degree of removal between RWEs may be considered a lower level of intimacy, and assigned lower intimacy score. Intimacy may be based solely on explicit social data or may be expanded to include all W4 data including spatial data and temporal data.

Each RWE 102, 104, 106, 108, 110, 112, 140, 142, 144 of the W4 COMN may be associated with one or more IOs as shown. Continuing the examples discussed above, FIG. 1 illustrates two IOs 122, 124 as associated with the cell phone device 104. One IO 122 may be a passive data object such as an event record that is used by scheduling/calendaring software on the cell phone, a contact IO used by an address book application, a historical record of a transaction made using the device 104 or a copy of a message sent from the device 104. The other IO 124 may be an active software process or application that serves as the device's proxy to the W4 COMN by transmitting or receiving data via the W4 COMN. Voice communication software, scheduling/calendaring software, an address book application or a text messaging application are all examples of IOs that may communicate with other IOs and RWEs on the network. The IOs 122, 124 may be locally stored on the device 104 or stored remotely on some node or datastore accessible to the W4 COMN, such as a message server or cell phone service datacenter. The IO 126 associated with the vehicle 108 may be an electronic file containing the specifications and/or current status of the vehicle 108, such as make, model, identification number, current location, current speed, current condition, current owner, etc. The IO 128 associated with sensor 108 may identify the current state of the subject(s) monitored by the sensor 108, such as current weather or current traffic. The IO 130 associated with the cell phone 110 may be information in a database identifying recent calls or the amount of charges on the current bill.

Furthermore, those RWEs which can only interact with the W4 COMN through proxies, such as the people 102, 140, 142, 144, computing devices 104, 106 and location 112, may have one or more IOs 132, 134, 146, 148, 150 directly associated with them. An example includes IOs 132, 134 that contain contact and other RWE-specific information. For example, a person's IO 132, 146, 148, 150 may be a user profile containing email addresses, telephone numbers, physical addresses, user preferences, identification of devices and other RWEs associated with the user, records of the user's past interactions with other RWE's on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.). Another example of a person's IO 132, 146, 148, 150 includes remote applications through which a person can communicate with the W4 COMN such as an account with a web-based email service such as Yahoo! Mail. The location's IO 134 may contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In order to correlate RWEs and IOs to identify relationships, the W4 COMN makes extensive use of existing metadata and generates additional metadata where necessary.

Metadata is loosely defined as data that describes data. For example, given an IO such as a music file, the core, primary or object data of the music file is the actual music data that is converted by a media player into audio that is heard by the listener. Metadata for the same music file may include data identifying the artist, song, etc., album art, and the format of the music data. This metadata may be stored as part of the music file or in one or more different IOs that are associated with the music file or both. In addition, W4 metadata for the same music file may include the owner of the music file and the rights the owner has in the music file. As another example, if the IO is a picture taken by an electronic camera, the picture may include in addition to the primary image data from which an image may be created on a display, metadata identifying when the picture was taken, where the camera was when the picture was taken, what camera took the picture, who, if anyone, is associated (e.g., designated as the camera's owner) with the camera, and who and what are the subjects of in the picture. The W4 COMN uses all the available metadata in order to identify implicit and explicit associations between entities and data objects.

Figure 2:
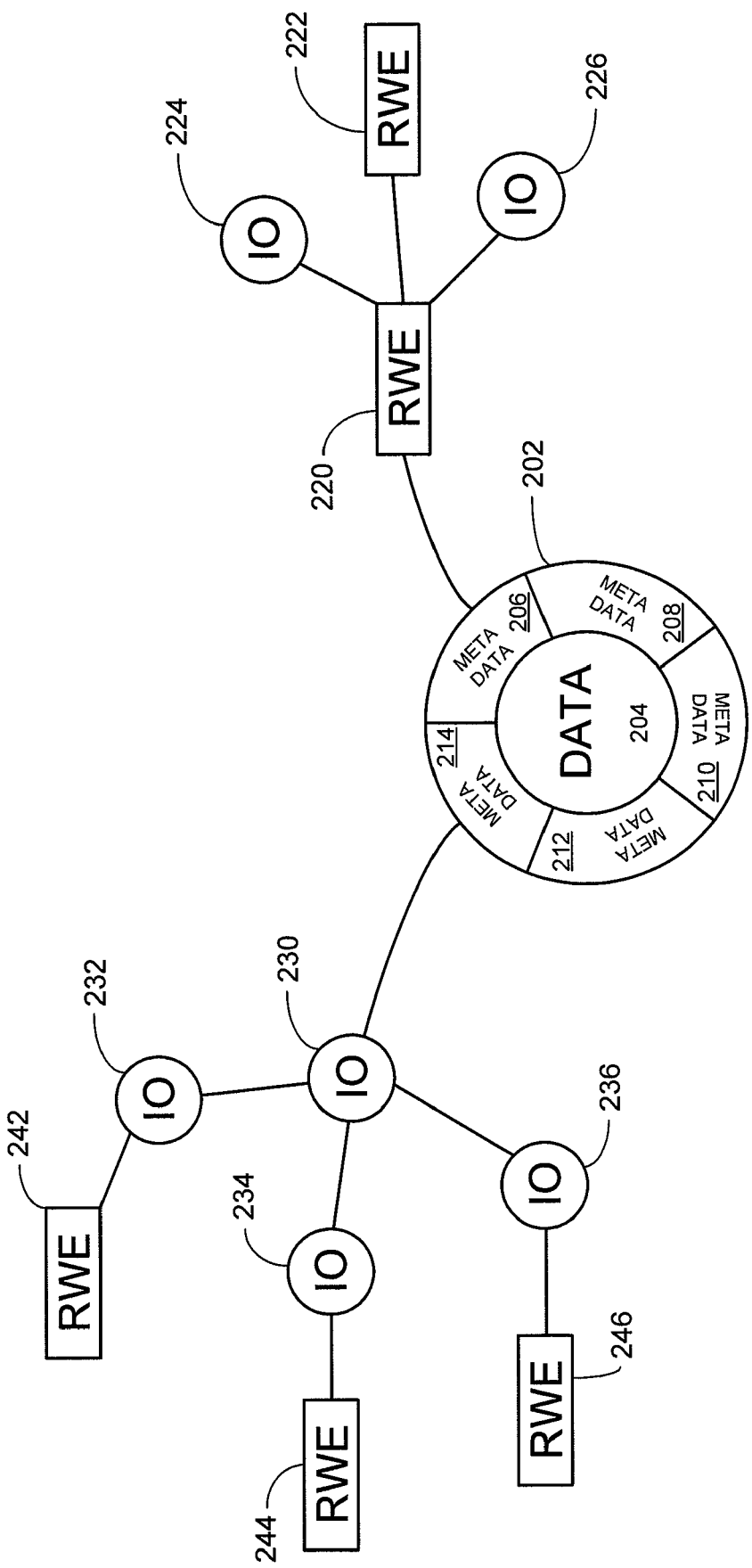
FIG. 2 illustrates an example of metadata defining the relationships between RWEs and IOs on the W4 COMN.

FIG. 2 illustrates an example of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 may contain information related only to the object data 204 and unrelated to any other IO or RWE. For example, a creation date, text or an image that is to be associated with the object data 204 of the IO 202.

Some of items of metadata 206, 214, on the other hand, may identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. This part of FIG. 2, for example, could describe the relations between a picture (IO 202) containing metadata 206 that identifies the electronic camera (the first RWE 220) and the user (the second RWE 224) that is known by the system to be the owner of the camera 220. Such ownership information may be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
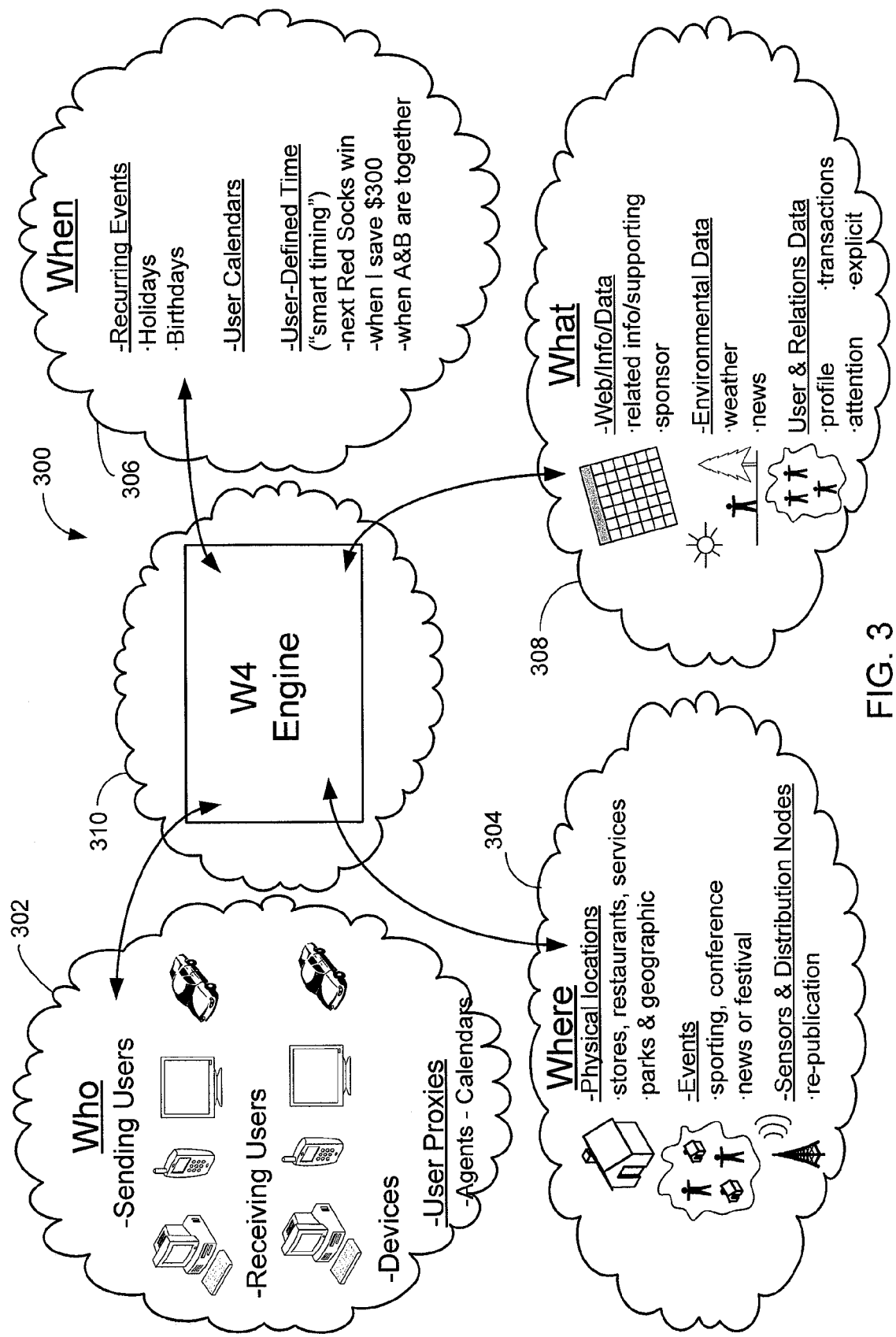
FIG. 3 illustrates a conceptual model of the W4 COMN.

FIG. 3 illustrates a conceptual model of the W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc. In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs). The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

As this is just a conceptual model, it should be noted that some entities, sensors or data will naturally exist in multiple clouds either disparate in time or simultaneously. Additionally, some IOs and RWEs may be composites in that they combine elements from one or more clouds. Such composites may be classified or not as appropriate to facilitate the determination of associations between RWEs and IOs. For example, an event consisting of a location and time could be equally classified within the When cloud 306, the What cloud 308 and/or the Where cloud 304.

The W4 engine 310 is center of the W4 COMN's central intelligence for making all decisions in the W4 COMN. An "engine" as referred to herein is meant to describe a software, hardware or firmware (or combinations thereof) system, process or functionality that performs or facilitates the processes, features and/or functions described herein (with or without human interaction or augmentation). The W4 engine 310 controls all interactions between each layer of the W4 COMN and is responsible for executing any approved user or application objective enabled by W4 COMN operations or inter-operating applications. In an embodiment, the W4 COMN is an open platform upon which anyone can write an application. To support this, it includes standard published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which may include storing copies of IOs and information identifying all RWEs and other information related to the IOs (e.g., who, what, when, where information). Other data collected by the W4 COMN may include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs is referred to as entity extraction. Entity extraction includes both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only W4 metadata related to the object (e.g., date of creation, owner, recipient, transmitting and receiving RWEs, type of IO, etc.), but no knowledge of the internals of the IO (i.e., the actual primary or object data contained within the object). Knowing the content of the IO does not prevent W4 data about the IO (or RWE) to be gathered. The content of the IO if known can also be used in entity extraction, if available, but regardless of the data available entity extraction is performed by the network based on the available data. Likewise, W4 data extracted around the object can be used to imply attributes about the object itself, while in other embodiments, full access to the IO is possible and RWEs can thus also be extracted by analyzing the content of the object, e.g. strings within an email are extracted and associated as RWEs to for use in determining the relationships between the sender, user, topic or other RWE or IO impacted by the object or process.

In an embodiment, the W4 engine 310 represents a group of applications executing on one or more computing devices that are nodes of the W4 COMN. For the purposes of this disclosure, a computing device is a device that includes a processor and memory for storing data and executing software (e.g., applications) that perform the functions described. Computing devices may be provided with operating systems that allow the execution of software applications in order to manipulate data.

In the embodiment shown, the W4 engine 310 may be one or a group of distributed computing devices, such as a general-purpose personal computers (PCs) or purpose built server computers, connected to the W4 COMN by suitable communication hardware and/or software. Such computing devices may be a single device or a group of devices acting together. Computing devices may be provided with any number of program modules and data files stored in a local or remote mass storage device and local memory (e.g., RAM) of the computing device. For example, as mentioned above, a computing device may include an operating system suitable for controlling the operation of a networked computer, such as the WINDOWS XP or WINDOWS SERVER operating systems from MICROSOFT CORPORATION.

Some RWEs may also be computing devices such as smart phones, web-enabled appliances, PCs, laptop computers, and personal data assistants (PDAs). Computing devices may be connected to one or more communications networks such as the Internet, a publicly switched telephone network, a cellular telephone network, a satellite communication network, a wired communication network such as a cable television or private area network. Computing devices may be connected any such network via a wired data connection or wireless connection such as a wi-fi, a WiMAX (802.36), a Bluetooth or a cellular telephone connection.

Local data structures, including discrete IOs, may be stored on a mass storage device (not shown) that is connected to, or part of, any of the computing devices described herein including the W4 engine 310. For example, in an embodiment, the data backbone of the W4 COMN, discussed below, includes multiple mass storage devices that maintain the IOs, metadata and data necessary to determine relationships between RWEs and IOs as described herein. A mass storage device includes some form of computer-readable media and provides non-volatile storage of data and software for retrieval and later use by one or more computing devices. Although the description of computer-readable media contained herein refers to a mass storage device, such as a hard disk or CD-ROM drive, it should be appreciated by those skilled in the art that computer-readable media can be any available media that can be accessed by a computing device.

By way of example, and not limitation, computer-readable media may comprise computer storage media and communication media. Computer storage media include volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassette, magnetic tape, magnetic disk storage or other magnetic storage devices, or any other medium which can be used to store the desired information and which can be accessed by the computer.

Figure 4:
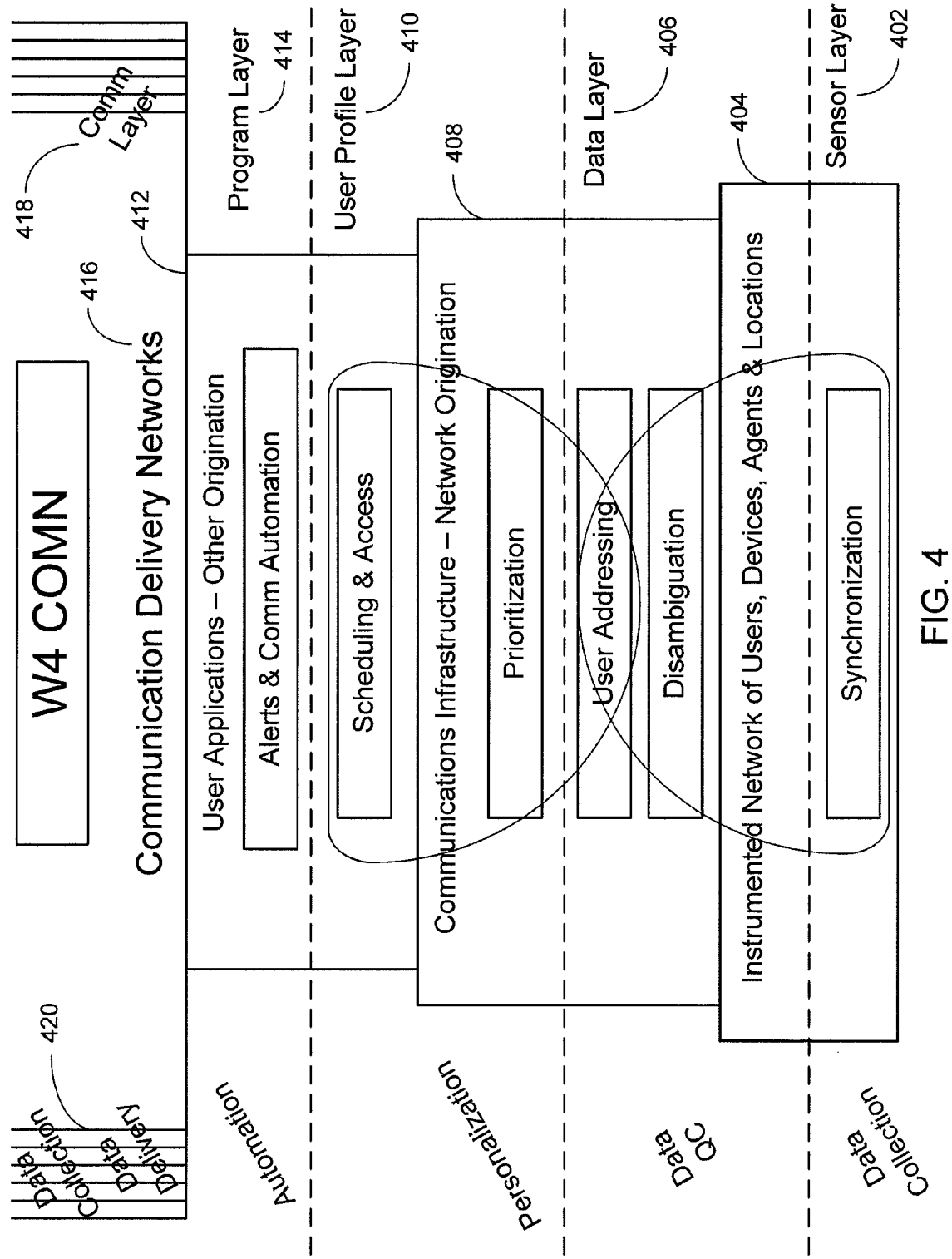
FIG. 4 illustrates the functional layers of the W4 COMN architecture.

FIG. 4 illustrates the functional layers of the W4 COMN architecture. At the lowest layer, referred to as the sensor layer 402, is the network 404 of the actual devices, users, nodes and other RWEs. The instrumentation of the network nodes to utilize them as sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The next layer is the data layer 406 in which the data produced by the sensor layer 402 is stored and cataloged. The data may be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The next layer of the W4 COMN is the user profiling layer 410. This layer 410 may further be distributed between the network infrastructure 408 and user applications/processes 412 executing on the W4 engine or disparate user computing devices. In the user profiling layer 410 that functions as W4 COMN's user profiling layer 410. Personalization is enabled across any single or combination of communication channels and modes including email, IM, texting (SMS, etc.), photobloging, audio (e.g. telephone call), video (teleconferencing, live broadcast), games, data confidence processes, security, certification or any other W4 COMM process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available to all processes of all applications approved on the W4 COMN. All Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from anything other than the network, e.g., RWEs such as users, locations, proxies and processes, come from the applications layer 414 of the W4 COMN. Some applications may be developed by the W4 COMN operator and appear to be implemented as part of the communications infrastructure 408, e.g. email or calendar programs because of how closely the operate with the sensor processing and user profiling layer 410. The applications 412 also serve some role as a sensor in that they, through their actions, generate data back to the data layer 406 via the data backbone concerning any data created or available due to the applications execution.

The applications layer 414 also provides a personalized user interface (UI) based upon device, network, carrier as well as user-selected or security-based customizations. Any UI can operate within the W4 COMN if it is instrumented to provide data on user interactions or actions back to the network. This is a basic sensor function of any W4 COMN application/UI, and although the W4 COMN can interoperate with applications/UIs that are not instrumented, it is only in a delivery capacity and those applications/UIs would not be able to provide any data (let alone the rich data otherwise available from W4-enabled devices.)

In the case of W4 COMN mobile devices, the UI can also be used to confirm or disambiguate incomplete W4 data in real-time, as well as correlation, triangulation and synchronization sensors for other nearby enabled or non-enabled devices. At some point, the network effects of enough enabled devices allow the network to gather complete or nearly complete data (sufficient for profiling and tracking) of a non-enabled device because of it's regular intersection and sensing by enabled devices in it's real-world location.

Above the applications layer 414 (and sometimes hosted within it) is the communications delivery network(s) 416. This can be operated by the W4 COMN operator or be independent third-party carrier service, but in either case it functions to deliver the data via synchronous or asynchronous communication. In every case, the communication delivery network 414 will be sending or receiving data (e.g., http or IP packets) on behalf of a specific application or network infrastructure 408 request.

The communication delivery layer 418 also has elements that act as sensors including W4 entity extraction from phonecalls, emails, blogs, etc. as well as specific user commands within the delivery network context, e.g., "save and prioritize this call" said before end of call may trigger a recording of the previous conversation to be saved and for the W4 entities within the conversation to analyzed and increased in weighting prioritization decisions in the personalization/user profiling layer 410.

Figure 5:
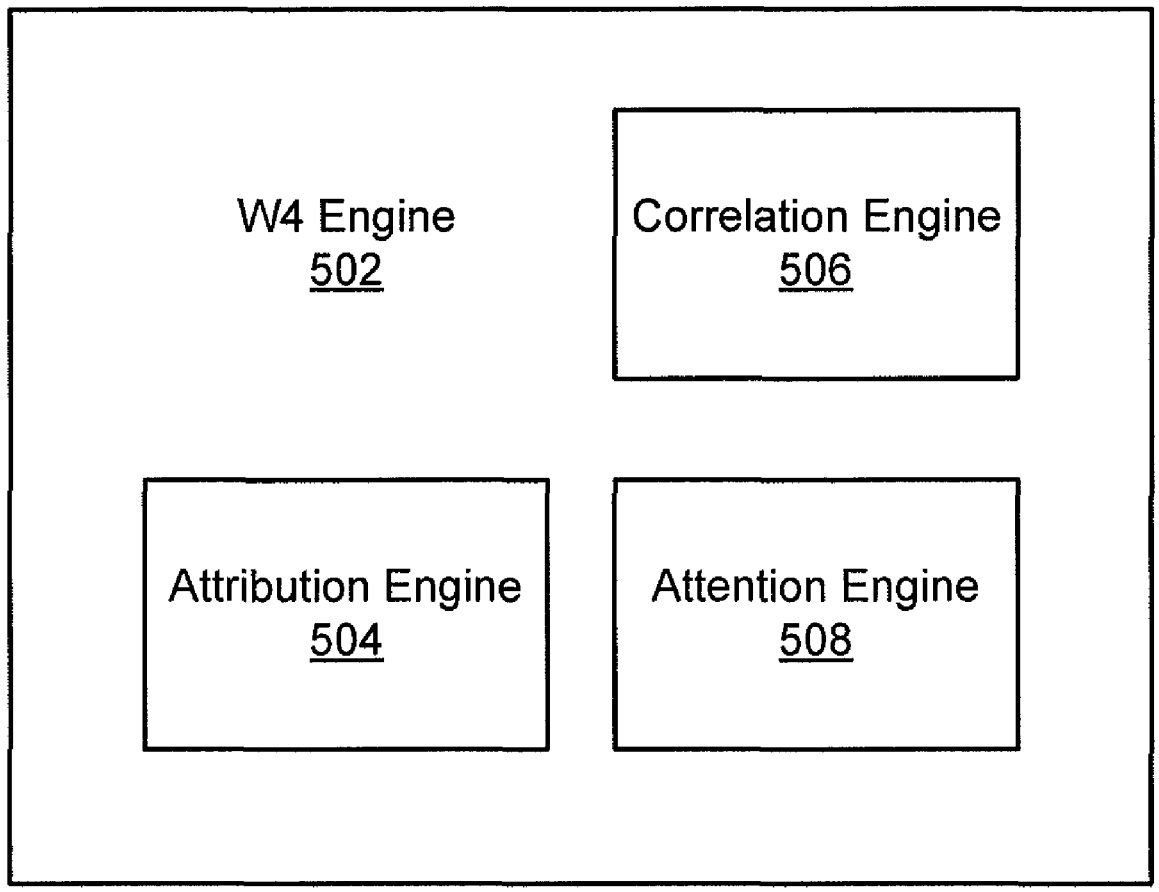
FIG. 5 illustrates an embodiment of analysis components of a W4 engine as shown in FIG. 2.

FIG. 5 illustrates an embodiment of analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. One such sub-engine is an attribution engine 504. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The W4 engine 502 further includes a correlation engine 506. The correlation engine 506 operates in two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data. In this embodiment, a histogram of all RWEs and IOs is created, from which correlations based on the graph may be made. Graphing, or the act of creating a histogram, is a computer science method of identify a distribution of data in order to identify relevant information and make correlations between the data. In a more general mathematical sense, a histogram is simply a mapping $m_i$ that counts the number of observations that fall into various disjoint categories (known as bins), whereas the graph of a histogram is merely one way to represent a histogram. By selecting each IO, RWE, and other known parameters (e.g., times, dates, locations, etc.) as different bins and mapping the available data, relationships between RWEs, IOs and the other parameters can be identified.

As a pre-processor, the correlation engine 506 monitors the information provided by RWEs in order to determine if any conditions are identified that may trigger an action on the part of the W4 engine 502. For example, if a delivery condition has be associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
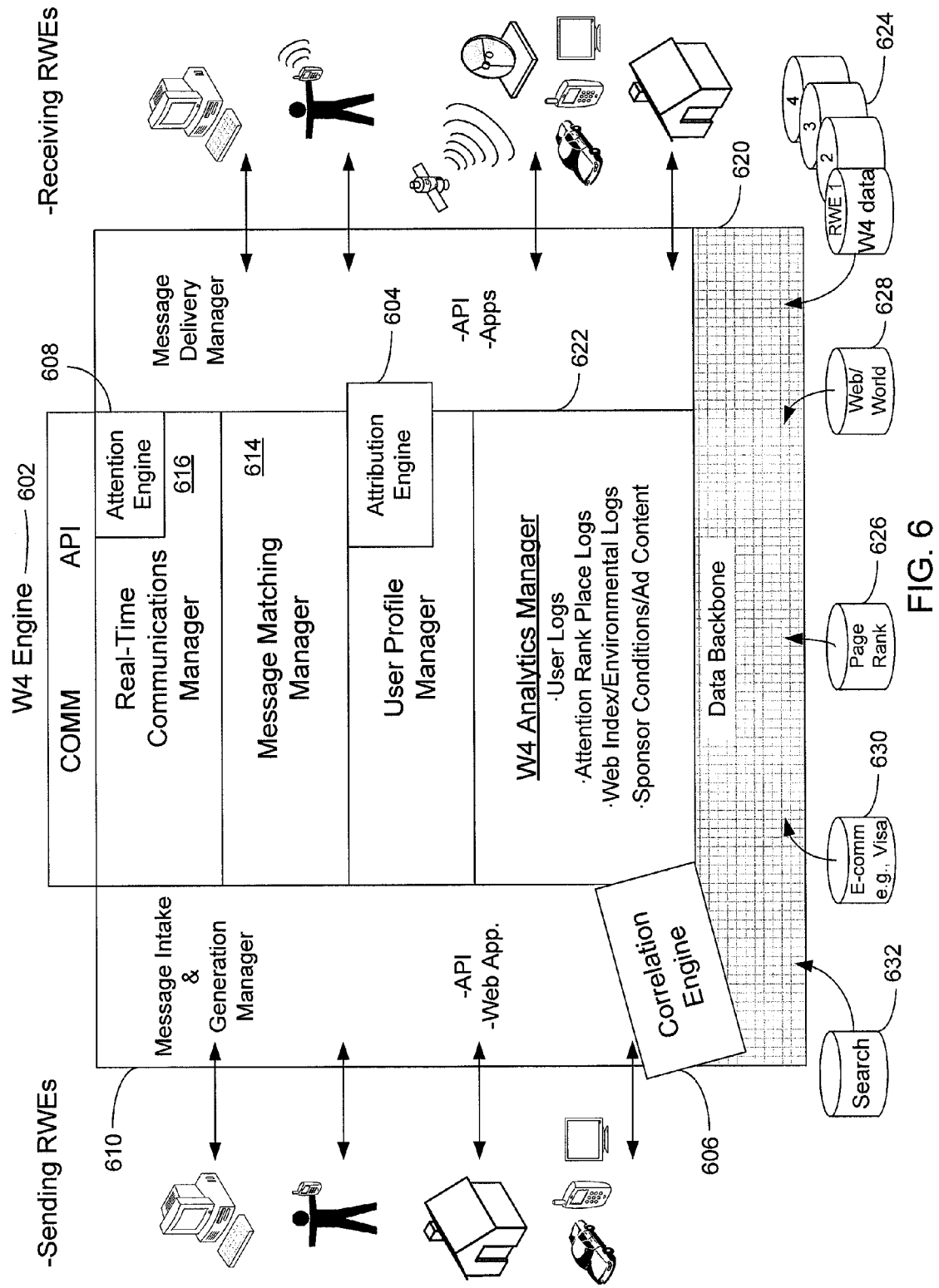
FIG. 6 illustrates an embodiment of a W4 engine showing different components within the sub-engines described generally above with reference to FIG. 5.

FIG. 6 illustrates an embodiment of a W4 engine showing different components within the sub-engines described generally above with reference to FIG. 4. In one embodiment the W4 engine 600 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622 and includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4COMN process, IO or event. Because of the amount of data that the W4 COMN will potentially store, the data backbone 620 includes numerous database servers and datastores in communication with the W4 COMN to provide sufficient storage capacity.

As discussed above, the data collected by the W4 COMN includes spatial data, temporal data, RWE interaction data, IO content data (e.g., media data), and user data including explicitly-provided and deduced social and relationship data. Spatial data may be any data identifying a location associated with an RWE. For example, the spatial data may include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data may be passively collected time data (e.g., time data from a clock resident on the electronic device, or time data from a network clock), or the temporal data may be actively collected time data, such as time data entered by the user of the electronic device (e.g., a user maintained calendar).

The interaction data may be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
| --- | --- | --- |
| Cell tower data | Time stamps | Interpersonal |
| GPRS data | Local clock | communication data |
| GPS data | Network clock | Media data |
| WiFi data | User input of | Relationship data |
| Personal area network data | time data | Transactional data |
| Network access points data | | Device interaction data |
| User input of location data | | |
| Geo-coordinates data | | |

With respect to the interaction data, communications between any RWEs may generate communication data that is transferred via the W4 COMN. For example, the communication data may be any data associated with an incoming or outgoing short message service (SMS) message, email message, voice call (e.g., a cell phone call, a voice over IP call), or other type of interpersonal communication relative to an RWE, such as information regarding who is sending and receiving the communication(s). As described above, communication data may be correlated with, for example, temporal data to deduce information regarding frequency of communications, including concentrated communication patterns, which may indicate user activity information.

Logical and IO data refers to the data contained by an IO as well as data associated with the IO such as creation time, owner, associated RWEs, when the IO was last accessed, etc. If the is a media object, the term media data may be used. Media data may include any data relating to presentable media, such as audio data, visual data, and audiovisual data. For example, the audio data may be data relating to downloaded music, such as genre, artist, album and the like, and includes data regarding ringtones, ringbacks, media purchased, playlists, and media shared, to name a few. The visual data may be data relating to images and/or text received by the electronic device (e.g., via the Internet or other network). The visual data may be data relating to images and/or text sent from and/or captured at the electronic device. The audiovisual data may be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data may include data relating to the user's RSS feeds, subscriptions, group memberships, game services, alerts, and the like. The media data also includes non-network activity, such as image capture and/or video capture using an electronic device, such as a mobile phone. The image data may include metadata added by the user, or other data associated with the image, such as, with respect to photos, location when the photos were taken, direction of the shot, content of the shot, and time of day, to name a few. As described in further detail below, media data may be used, for example, to deduce activities information or preferences information, such as cultural and/or buying preferences information.

The relationship data may include data relating to the relationships of an RWE or IO to another RWE or IO. For example, the relationship data may include user identity data, such as gender, age, race, name, social security number, photographs and other information associated with the user's identity. User identity information may also include e-mail addresses, login names and passwords. Relationship data may further include data identifying explicitly associated RWEs. For example, relationship data for a cell phone may indicate the user that owns the cell phone and the company that provides the service to the phone. As another example, relationship data for a smart car may identify the owner, a credit card associated with the owner for payment of electronic tolls, those users permitted to drive the car and the service station for the car.

Relationship data may also include social network data. Social network data includes data relating to any relationship that is explicitly defined by a user or other RWE, such as data relating to a user's friends, family, co-workers, business relations, and the like. Social network data may include, for example, data corresponding with a user-maintained electronic address book. Relationship data may be correlated with, for example, location data to deduce social network information, such as primary relationships (e.g., user-spouse, user-children and user-parent relationships) or other relationships (e.g., user-friends, user-co-worker, user-business associate relationships). Relationship data also may be utilized to deduce, for example, activities information.

The interaction data may also include transactional data. The transactional data may be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data may be utilized, for example, to deduce activities and preferences information. The transactional information may also be used to deduce types of devices and/or services the user owns and/or in which the user may have an interest.

The interaction data may also include device or other RWE interaction data. Such data includes both data generated by interactions between a user and a RWE on the W4 COMN and interactions between the RWE and the W4 COMN. RWE interaction data may be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data may be correlated with other data to deduce information regarding user activities and patterns associated therewith. Table 2, below, is a non-exhaustive list including examples of interaction data.

TABLE 2

Examples of Interaction Data

| Type of Data | Example(s) |
|---|---|
| Interpersonal communication data | Text-based communications, such as SMS and e-mail |
| | Audio-based communications, such as voice calls, voice notes, voice mail |
| | Media-based communications, such as multimedia messaging service (MMS) communications |
| | Unique identifiers associated with a communication, such as phone numbers, e-mail addresses, and network addresses |
| Media data | Audio data, such as music data (artist, genre, track, album, etc.) |
| | Visual data, such as any text, images and video data, including Internet data, picture data, podcast data and playlist data |
| | Network interaction data, such as click patterns and channel viewing patterns |
| Relationship data | User identifying information, such as name, age, gender, race, and social security number |
| | Social network data |
| Transactional data | Vendors |
| | Financial accounts, such as credit cards and banks data |
| | Type of merchandise/services purchased |
| | Cost of purchases |
| | Inventory of purchases |
| Device interaction data | Any data not captured above dealing with user interaction of the device, such as patterns of use of the device, applications utilized, and so forth |

Data Synchronization

One notable aspect of the W4 COMN is the ability to synchronize data between disparate IOs located at different points in the network and that may be owned or associated with different RWEs.

Synchronization as performed by the W4 COMN uses the co-occurrence of content, data and/or meta-data on the W4 COMN to quality control IO content for validity, accuracy and frictionless, automatic dissemination across the W4 COMN. The correlation engine of the W4 COMN performs correlations using W4 data to weight occurrences of related or identical IOs and RWEs. A synchronization engine is then able to tie and associate all content and IOs with uniquely identified RWEs across all classes of ownership, reference and attention. The W4 COMN can then decide which IOs to synchronize based the correlations.

Figure 9:
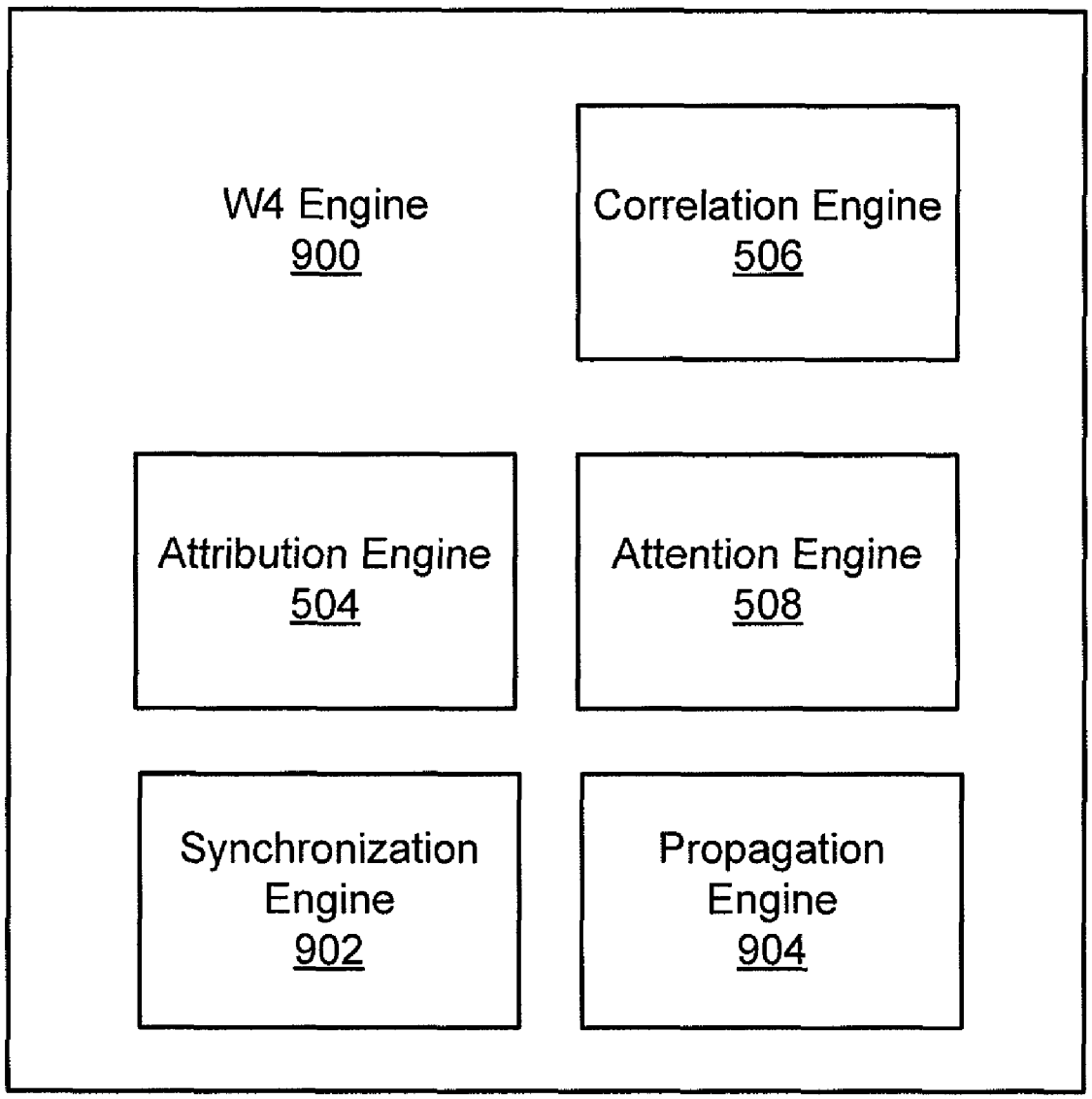
FIG. 9 illustrates some of the elements in a W4 engine adapted to perform W4 synchronizations as described herein.

FIG. 9 illustrates some of the elements in a W4 engine adapted to perform W4 synchronizations as described herein. The W4 engine 900 includes a correlation engine 506, an attribution engine 504 and an attention engine 508 as described above. In addition, the W4 engine includes a synchronization engine 902 that, based on the correlations between IOs and RWEs as described below, identifies which IOs to synchronize and what data in each IO to synchronize. In the embodiment shown, a propagation engine 904 is also provided to propagate the synchronization to IOs which are to be synchronized but which may not be currently available to the W4 COMN.

One example of W4 COMN synchronization is the synchronization of contact information. The W4 COMN's synchronization process allows single source contact information management by enabling a user to alter one instance of a contact on one of their devices, e.g. change friend's cell number stored in their cell phone, and have the information automatically synchronized not only on all their RWEs (e.g., different address books maintained by different applications) but also to trusted users who have granted them propagation access rights for contact info.

Another use for W4 COMN synchronization relates to synchronization of sensor data. In this aspect, the W4 COMN synchronization process can be considered a sensor interpretation tool for operations data analysis. By treating the output of sensors as IOs, the W4 COMN synchronization process can automatically identify all related RWEs on the network that are associated with a sensor using its correlation processes. Thus, whenever a sensor's IO data changes in response to changed conditions, all RWEs on the network that, based on the correlations identified by the correlation engine, are associated with the sensor are alerted to the new data and synchronized with the sensor.

In the W4 synchronization process, rather than merely comparing two data objects to determine their similarity for deduplication and synchronization, also considers the social network structure and dynamics of the community of people and devices that have created and use the IOs to determine a one-to-many deduplication and synchronization that can take into account the social, temporal, spatial and topical relations of the creators and users of the IOs. The W4 COMN uses the social, temporal, spatial and topical relations of the creators and users to build a probabilistic model of each IO for each user that compares that object to similar objects as well as objects containing similar data created and used by people in the user's social network.

The W4 synchronization process specifically addresses such things as: IOs having incomplete or partial contact information; synchronizing all instances of contact information for a given user; and identifying incorrect information in IOs, such as spellings of names, based on correlations made using social, temporal, spatial and topical data.

Figure 7:
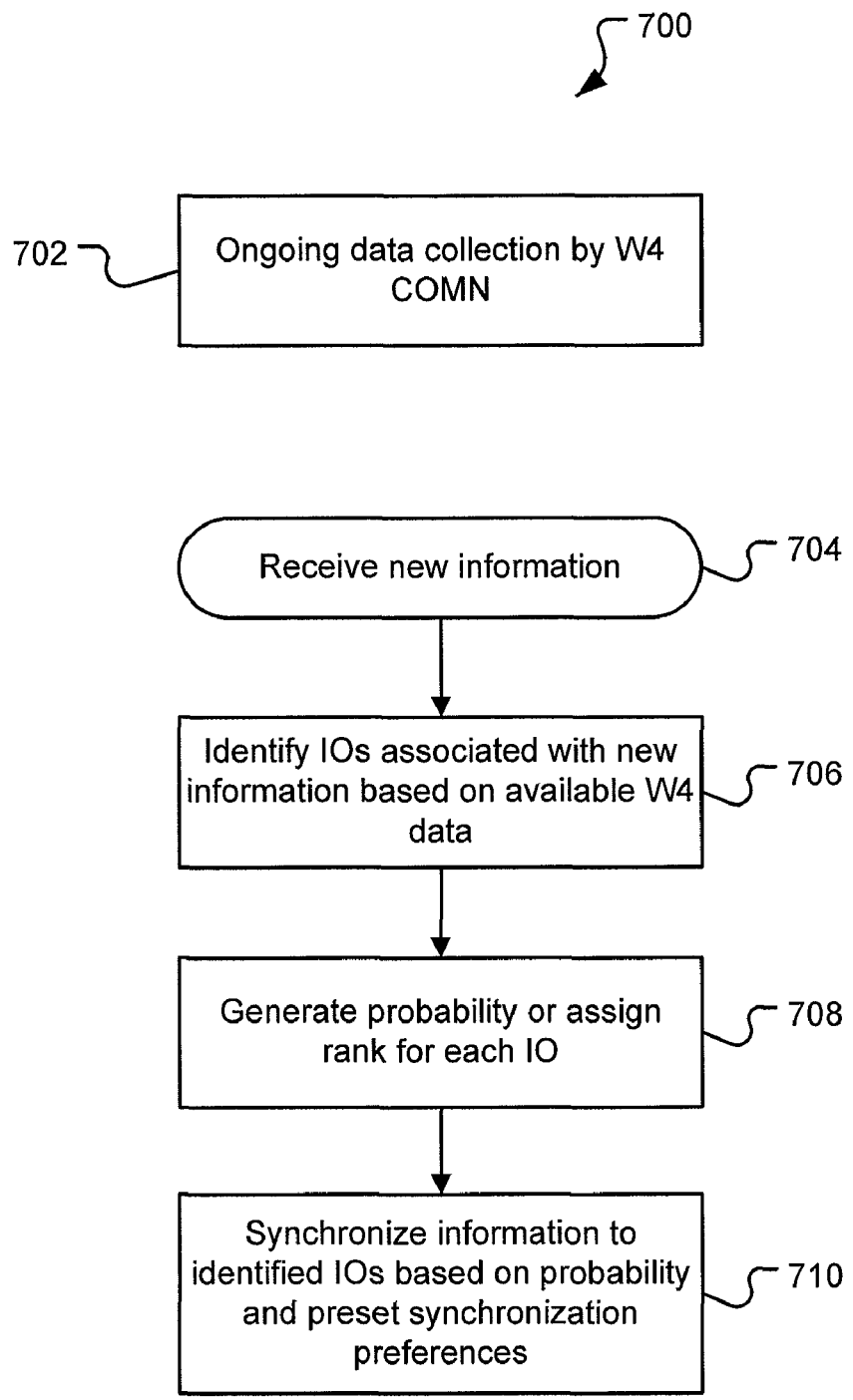
FIG. 7 illustrates an embodiment of a method for synchronizing data on a network using social, temporal, spatial and topical data for RWs on the network.

FIG. 7 illustrates an embodiment of a method for synchronizing data on a network using social, temporal, spatial and topical data for RWEs on the network. As described above, a foundational aspect of the synchronization method is the ongoing collection and maintenance of W4 data from the RWEs interacting with the network. In an embodiment, this collection and maintenance is an independent operation 702 of the W4 COMN and thus current W4 social, temporal, spatial and topical data are always available for use in synchronization. In addition, part of this operation 702 includes the determination of ownership and the association of different RWEs with different IOs as described above. Therefore, each IO is owned/controlled by at least one RWE with a known, unique identifier on the W4 COMN and each IO may have many other associations with other RWEs that are known to the W4 COMN.

In the embodiment of the synchronization method 700 illustrated, the method 700 begins when new information is received such as through receipt, identification or detection of a new or changed IO on the W4 COMN in a receive new/changed IO operation 704. For example, when person A updates and saves contact information for person B on one or person A's devices, the W4 COMN may receive a notification that the IO containing the contact information has been changed. In a sensor embodiment, the receive operation 704 could occur when a sensor makes its periodic or occasional update to an IO to reflect the current sensor reading. The receive operation 704 could also occur as the result of the W4 COMN detecting the creation of a new contact IO by a person or the generation of a new IO by some RWE. In some cases, the detection of a new IO may occur automatically when the IO is first stored by the RWE. For example, if the RWE is fully integrated with the W4 COMN any such IOs created by the RWE may be automatically stored, analyzed and synchronized as part of the initial data collection by the W4 COMN for the new IO. Alternatively, the W4 COMN may not learn of the existence of the new IO until the creating RWE interacts with the W4 COMN such as by backing up the new IO on the W4 COMN, expressly requesting that the IO by synchronized with the W4 COMN or other RWEs on the network or the first time the new IO is transmitted via the W4 COMN.

The method 700 then identifies other remote IOs on or known to the W4 COMN that contain at least some of the same new information in an identification operation 706. This is done by first identifying what RWEs that the new information are associated and the relationship of each RWE with the new information and then identifying remote IOs that have similar associations and relationships. Specifically, if the new information is contact information, the identification operation 706 will identify the RWE that the new information is for, i.e., that RWE that will be contacted via the new information.

The first task of the identify operation 706, determining what RWEs are associated with the new information, is assisted by the W4 COMN use of unique identifiers. In many situations, the new IO will be associated with several RWEs and those associations will readily and easily identifiable by the W4 engine. For example, a W4 contact IO or contact information may include an explicit identification of the unique W4 COMN identifier for the RWE that the new information is for. As another example, if the new information is new contact information stored into an existing contact IO in an address book, that contact IO will already be associated with one or more RWEs for which the unique identifiers have already been identified. Continuing the Person A and person B example from above, if the new information is a new cell phone number for person B that has been added to an existing contact IO for person B, because the W4 COMN is already aware that the contact IO is for person B (via a prior association of person B's unique identifier with all the information in the contact IO) the W4 engine can readily identify the new information as new information for person B. In the sensor example, the associations may also be easily identified in that an IO containing the current sensor results may only be associated with its owner RWE and with those RWEs that pay attention to the IO.

In some cases, the task of determining what RWEs are associated with the new information may be more complicated. For example, the new information may be a new IO previously unknown to the W4 COMN. However, in the case of contact information contained in the new IO, that contact information itself may be used to identify RWEs on the W4 COMN. For example, if the new IO is a contact IO containing new contact information, e.g., email address, telephone number, physical address, place of employment, etc., that contact information can be used to identify the RWEs that correspond to that contact information and from knowledge of those RWEs, other RWEs may be determined.

A simple example of this is a new contact IO containing a telephone number for a cell phone. The cell phone number will be associated with a unique identifier for the RWE/cell phone having that number. That RWE may further be explicitly be associated with an RWE/user (e.g., person B) that owns the cell phone. Thus, the new contact IO can be easily identified as being associated at least with the cell phone of person B and by extension, to person B as well.

In the above examples, there has been information available that directly and explicitly identify associated RWEs (e.g., the new information identifies a first RWE—cell phone—that has been previously explicitly associated with a second RWE—the cell phone is the cell phone for person B). Even more complicated analyses may be performed in which a best guess may be made by the W4 COMN in the absence of explicit associations. Such a process is referred to as disambiguation, which may be performed using different data and different techniques. A description of disambiguation is beyond the scope of this disclosure and, for the purposes of describing synchronization of data on the W4 COMN, it is understood that regardless of the techniques used, the identification operation 706 includes a determination of what RWE (s) are associated, and the nature of those associations, the new information received in the receive operation 704.

After the RWEs associated with the new information have been determined, the identification operation 706 then identifies those other IOs on the W4 COMN that are associated with the same RWEs. In an embodiment, this is done by searching for remote IOs associated with the unique identifiers of the RWEs associated with the new information. For example, if the new information is contact information for person B, then the method 700 identifies other IOs on the network that contain the same class or type (e.g., telephone number, email address) of contact information for person B. These may be other contact IOs stored on and owned by other RWEs (e.g., a cell phone owned by person C). The IOs identified need not be associated with person A or the RWE that created or supplied the new information to the W4 COMN.

After the initial identification operation 706, each identified remote IO and the new IO are then evaluated to determine if the remote IO should be changed in light of the new information in an correlation operation 708. In an embodiment, the correlation operation 708 includes generating a probability score for each identified remote IO and the new IO based on a comparison of the new information and its associated RWEs and other information and the contents of the remote IO, its associated RWEs and any other information known about the remote IO by the W4 COMN. The probability score is a measure of the likelihood, determined based on the available data, that a specific piece of information (e.g., an attribute such as an address, name, telephone number, etc.) within an IO or an entire IO is old information and should be replaced by the correct information. In an embodiment, a probability score may be assigned to each IO and that score is applicable to all attributes within the IO. In an alternative embodiment, a probability score may be generated specifically for each attribute within each IO.

In an embodiment, in order to generate a probability score, the correlation operation 708 may generate a histogram using the spatial, temporal, interaction and social data known to the W4 COMN. This information is retrieved from the data backbone of the W4 COMN including social data, spatial data, temporal data and logical data associated with the RWEs and IOs identified in the identification operation 706. From the results of the histogram, the IO may be assigned a probability that takes into account the different relationships of the associated RWEs to the IO.

For example, in an embodiment the histogram is generated in order to compare the retrieved social data, spatial data, temporal data and logical data to identify a set of most probable attributes for the RWE identified by the new information. This may include comparing each attribute in the new IO with the set of most probable attributes for the RWE.

In an embodiment, the W4 data are processed and analyzed using data models that treat data not as abstract signals stored in databases, but rather as IOs that represent RWEs that actually exist, have existed, or will exist in real space, real time, and are real people, objects, places, times, and/or events. As such, the data model for W4 IOs that represent W4 RWEs (Where/When/Who/What) will model not only the signals recorded from the RWEs or about the RWEs, but also represent these RWEs and their interactions in ways that model the affordances and constraints of entities and activities in the physical world. A notable aspect is the modeling of data about RWEs as embodied and situated in real world contexts so that the computation of similarity, clustering, distance, and inference take into account the states and actions of RWEs in the real world and the contexts and patterns of these states and actions.

For example, for temporal data the computation of temporal distance and similarity in a W4 data model cannot merely treat time as a linear function. The temporal distance and similarity between two times is dependent not only on the absolute linear temporal delta between them (e.g., the number of hours between "Tuesday, November 20, 4:00 pm Pacific Time" and "Tuesday, November 20, 7:00 pm Pacific Time"), but even more so is dependent on the context and activities that condition the significance of these times in the physical world and the other W4 RWEs (people, places, objects, and events) etc.) associated with them. For example, in terms of distance and similarity, "Tuesday, November 20, 4:00 pm Pacific Time" and "Tuesday, November 27, 4:00 pm Pacific Time" may be modeled as closer together in a W4 temporal data model than "Tuesday, November 20, 4:00 pm Pacific Time" and "Tuesday, November 20, 7:00 pm Pacific Time" because of the weekly meeting that happens every Tuesday at work at 4:00 pm vs. the dinner at home with family that happens at 7 pm on Tuesdays. Contextual and periodic patterns in time may be important to the modeling of temporal data in a W4 data model.

An even simpler temporal data modeling issue is to model the various periodic patterns of daily life such as day and night (and subperiods within them such as morning, noon, afternoon, evening, etc.) and the distinction between the workweek and the weekend. In addition, salient periods such as seasons of the year and salient events such as holidays also affect the modeling of temporal data to determine similarity and distance. Furthermore, the modeling of temporal data for IOs that represent RWEs should correlate temporal, spatial, and weather data to account for the physical condition of times at different points on the planet. Different latitudes have different amounts of daylight and even are opposite between the northern and southern hemispheres. Similar contextual and structural data modeling issues arise in modeling data from and about the RWEs for people, groups of people, objects, places, and events.

With appropriate data models for IOs that represent data from or about RWEs, a variety of machine learning techniques can be applied to analyze the W4 data. In an embodiment, W4 data may modeled as a "feature vector" in which the vector includes not only raw sensed data from or about W4 RWEs, but also higher order features that account for the contextual and periodic patterns of the states and action of W4 RWEs. Each of these features in the feature vector may have a numeric or symbolic value that can be compared for similarity to other numeric or symbolic values in a feature space. Each feature may also be modeled with an additional value from 0 to 1 (a certainty value) to represent the probability that the feature is true. By modeling W4 data about RWEs in ways that account for the affordances and constraints of their context and patterns in the physical world in features and higher order features with or without certainty values, this data (whether represented in feature vectors or by other data modeling techniques) can then be processed to determine similarity, difference, clustering, hierarchical and graph relationships, as well as inferential relationships among the features and feature vectors.

A wide variety of statistical and machine learning techniques can be applied to W4 data from simple histograms to Sparse Factor Analysis (SFA), Hidden Markov Models (HMMs), Support Vector Machines (SVMs), Bayesian Methods, etc. Such learning algorithms may be populated with data models that contain features and higher order features represent not just the "content" of the signals stored as IOs, e.g., the raw W4 data, but also model the contexts and patterns of the RWEs that exist, have existed, or will exist in the physical world from which these data have been captured.

The generation of a probability score for IOs is then based on a rich amount of data, each which may be weighted differently in order to identify an RWE that, based on all the data available, is the most likely to be the IO containing the currently accurate information. For example, pre-existing explicit associates between persons (e.g., person A and person B have listed each other as friends on a social network or are known to be family members), evidence that the two persons have recently or are currently co-located, data indicating that the two have recently been or are currently in communication may be weighted more heavily than other data. Thus, in one embodiment generating a probability score may include determining if there is any relationship between the RWE that provided the new information, the RWE that is the subject of the new information, and the RWE(s) that are associated with the remote IOs based on the available data. Each relationship may then be provided with a predetermined relative weight or importance when calculating the probability score. For example, if person A and person B are identified as very close friends by the W4 COMN, such as based on a recent history of multiple and frequent communications, the new information may be given a relatively higher probability based on the weight assigned to that relationship than new information that is provided by a person A that has no identifiable relationship with person B. As discussed above, such relationships may be determined by retrieving explicitly designated relationships from IOs associated with RWEs or may be determined by comparing available data related to the RWEs such as current and past contact information, communications, etc.

In the embodiment shown in FIG. 7, after the probability score is generated for each identified remote IO, data synchronization is performed in which information in one or more IOs is replaced in a data replacement operation 710. The determination of what information to replace in which IOs is made based on the probability scores generated in the correlation operation 710. In one embodiment, the determination involves the simple identification of the IO having the highest probability score. If that IO is the IO containing the new information, then the W4 COMN may initiate a process to synchronize some or all of the identified remote IOs with the new information by replacing the old information (e.g., replacing an attribute such as a telephone number in a contact IO) in the remote IOs. On the other hand, the data replacement operation 710 may determine that the new information received in the receiving operation 704 is actually no longer correct. For example, this may occur if person A is entering information from an old business card into an address book without the knowledge that some or all of the information on the old business card has been changed.

In an embodiment, the replacement operation 710 may generate a propagation plan that causes each remote IO, when it becomes accessible, to be synchronized. Thus, remote IOs that are not immediately accessible by the W4 COMN will be synchronized when they become accessible.

In an embodiment, the data replacement operation 710 may automatically replace data in some IOs, such as those IOs identified as having the same ownership as that of the RWE that initially provided the new information to the W4 COMN. For example, if person A is listed as being the owner of multiple RWEs, each having a different address book or contact IOs, then the replacement operation 710 may automatically update all the contact IOs on all commonly owned RWEs. Alternatively, the W4 COMN may, upon detection of the new information, prompt the user of the RWE that initially provided the new information to the W4 COMN to determine if the user wants to synchronize the new information to all the user's other devices and associated RWEs. The user may also be able to identify what devices to synchronize the new information to.

Similarly, IOs owned by third parties that are closely associated with the owner of the new information or the subject RWE of that information may be automatically synchronized. For example, a user may identify one or more friends in a social network and explicitly permit changes to contact information of these friends or associated with these friends to be synchronized automatically. Such friends may further have previously selected to allow all changes from friends in the network or to be prompted upon any attempt to synchronize new information. Such a prompt, for example, may look like, "Your friend, person A, has updated his information for another friend of yours, person B. Do you wish to accept the new information for person B into your contacts?"

In yet another embodiment, the replacement operation 710 may further propagate the new information only to RWEs that are designated by the RWE that provided in the new information and only to RWEs that have enabled receipt of the new information from the initiator. For example, person A may designate that any new information for person A be propagated to every IO on the W4 COMN in order to disseminate new contact information. Person A, however, may designate any new contact information for explicitly identified family members be propagated only to other family members. Similarly, on the receiving end, person A may also designate that new information for family members only be propagated to person A's RWEs from other family members.

Thus, the method 700 uses the social relations and comparative analysis of existing contact information among users to deduplicate and verify information based upon the social, temporal, spatial and topical relations between the owners/controllers of the objects and the actual content of each instance of a similar or identical object. Mapping existing data to real persons in order to disambiguate and verify the demographic or contact info for those people based upon not only the relations between the objects, the users and the data but also weighted based upon reputation, trust and relations.

Figure 8:
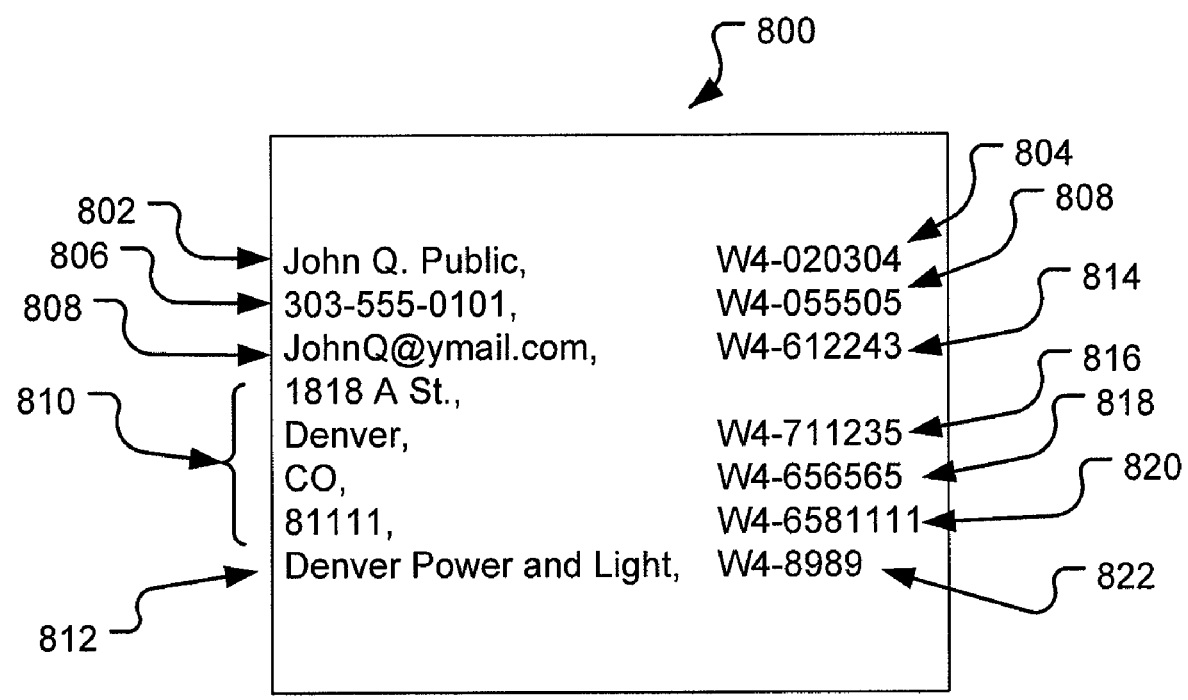
FIG. 8 illustrates an embodiment of data stored in a contact IO which uses W4 identifiers to assist in the synchronization of data across the W4 COMN.

FIG. 8 illustrates an embodiment of data stored in a contact IO which uses W4 identifiers to assist in the synchronization of data across the W4 COMN. In the embodiment shown, data in a contact IO 800 for an person is illustrated. Each data field corresponds to a different attribute of the contact IO 800. The contact IO 800 is for a person, John Q. Public, who is identified by one or more name fields 802. In addition, the contact IO 800 also identifies the same person using the unique W4 identifier 804 for that person in a second field 804. In the embodiment shown, the text string "W4-020304" is provided as an example to illustrate a unique identifier. Any identifier or identification string may be used as long as the string can be resolved to uniquely identify Mr. Public to the W4 COMN. By providing a unique identifier 804 for Mr. Public, the other contact attributes in the contact IO 800 can be explicitly associated with all instances of contact information for John Q. Public known to the W4 COMN.

In addition to the name attribute field 802, a telephone number field 806 is provided. In the embodiment shown, this field 806 is a cell phone number field which contains the number to dial to call Mr. Public's cell phone. Thus, the field 806 could be considered a unique communication system identifier, the system being the cellular communication system of networked cell towers. In addition to the cell phone number field 806, another field 808 is provided that includes the unique W4 identifier for the cell phone, which is an RWE known to the W4 COMN. The unique W4 identifier identifies the cell phone to the W4 COMN, but not to any specific communication system (e.g., telephone, mail, electronic mail, cellular communication, etc.)

An email address field 808 is also provided containing an email address for Mr. Public. An associated W4 address field 814 is provided that contains the unique W4 address for the IO (e.g., the ymail.com mail server application). The W4 identifier of an information object such as a email communication application may be limited to identifying the information object or may be a compound identifier that identifies both the email communication application and Mr. Public's account on that application.

The embodiment further illustrates Mr. Public's address 810 distributed throughout four different address attribute fields 810, in this case the common street address, city, state and postal code fields. In the embodiment, several of the address fields are associated with unique identifiers. The city field is associated with a W4 identifier field 816 that contains a unique W4 identifier for the RWE of Denver. Likewise, the state and postal code fields are each associated with a W4 identifier field 818, 820 that contains a unique W4 identifier for the state and postal code, respectively.

The embodiment further illustrates a place of employment for Mr. Public in a company field 812. The contact IO 800 contains another unique W4 identification field associated with the company field 812 that contains the unique identifier for the RWE that corresponds to the legal entity that is the identified company.

In the embodiment shown, the contact IO 800 is in the form of a paired comma delimited text file. The file may be interpretable by any application that is away of and can process the format. Other data formats are also possible including an XML or other self-identifying data format in which each attribute or field is declared within the data structure. In such embodiments, the W4 identifier may be separately declared as a separate attribute for each RWE within the contact IO 800 or the W4 identifier may be contained within each data element.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. For example, the contact IO of FIG. 8 could be broadened to be any generic IO on the W4 COMN in which, for each RWE identified in any field in the IO, a corresponding unique W4 identifier could be inserted or provided. For example, for every electronic mail message transmitted across the W4 COMN, each sender and recipient could be identified in the message IO by both their electronic mail address and their unique W4 identifier. The identification could be visible or invisible to the users, but could serve as a way to easily identify and synchronize information between different communication networks.

Numerous other changes may be made that will readily suggest themselves to those skilled in the art and which are encompassed in the spirit of the invention disclosed and as defined in the appended claims.

What is claimed is:

1. A method comprising:
   receiving, over a network, a first information object (IO) comprising for a target real-world entity (RWE), the first IO controlled by an owner RWE;
   identifying, via a computing device, a plurality of second IOs, each of the plurality of second IOs comprising one or more attributes for the target RWE, each of the plurality of second IOs independently controlled by a different one of a plurality of third-party RWEs, the plurality of third-party RWEs not comprising the target RWE and the owner RWE;
   retrieving social data, spatial data, temporal data and logical data available via the network associated with each RWE;
   correlating, via the computing device, the first IO, the plurality of second IOs and the social data, spatial data, temporal data and logical data where a probability score is generated for individual attributes within each IO; and
   automatically synchronizing, via the computing device, one or more of the attributes in at least one IO, said synchronization comprising replacing the one or more attributes in the at least one IO with a corresponding attribute from a different IO based on the probability score of the respective attribute.

2. The method of claim 1 further comprising:
   comparing each attribute in the first IO with a set of most probable attributes for the target RWE; and
   replacing one or more attributes in the first IO with a most probable attribute obtained from a second IO.

3. The method of claim 1 further comprising:
   comparing each attribute in a selected second IO with a set of most probable attributes for the target RWE; and
   replacing one or more attributes in the selected second IO with a most probable attribute obtained from a different IO.

4. The method of claim 1 such that where correlating comprises: for each IO, determining a relationship between the target RWE and the IO's associated owner or third-party RWE based on the at least one retrieved social data, spatial data, temporal data and logical data; and generating the probability scores for each IO based on the relationship between the target RWE and the IO's associated owner RWE or third-party RWE.

5. The method of claim 4, further comprising:
   assigning each relationship a relative weight; and
   generating the probability scores for each IO based at least in part on the relative weight assigned to the relationship between the target RWE and the IO's associated owner RWE or third-party RWE.

6. The method of claim 4, where said determining a relationship comprises
   comparing current attributes of the target RWE and the owner or third-party RWE;
   comparing past attributes of the target RWE and the owner or third-party RWE;
   retrieving a relationship previously selected by one of the target RWE or the owner or third-party RWE;
   comparing attributes of third-party RWEs having known relationships with both the target RWE and the owner RWE; and
   identifying messages between the target RWE and the owner or third-party RWE.

7. The method of claim 1, where the first IO includes a unique entity identifier for the target RWE and identifying a plurality of second IOs further comprises:
   identifying a plurality of second IOs comprising attributes associated with the unique entity identifier for the target RWE.

8. The method of claim 1, where correlating comprises generating, via the computing device, a combined graph of the social data, spatial data, temporal data and logical data.

9. The method of claim 1, where the combined graph comprises a histogram.

10. The method of claim 1, where the social data, spatial data, temporal data and logical data comprise a feature vector comprising raw sensed data relating to RWEs and contextual and periodic patterns of the states and action of RWEs.

11. The method of claim 10, where correlating comprises processing the feature vector to determine similarity, difference, clustering, hierarchical and graph and inferential relationships between RWEs to which the social data, spatial data, temporal data and logical data within the feature vector relate.

12. A method comprising:
   receiving, over a network, a first information object (IO) controlled by an owner RWE comprising a plurality of first IO attributes for a target real-world entity (RWE), the plurality of first IO attributes comprising social data, spatial data, temporal data and logical data, one of the plurality of first IO attributes comprising new information for the target RWE;
   identifying, via the computing device, a plurality of third-party RWEs using the at least some of plurality of first IO attributes, where each of the plurality of third-party RWEs are associated with the new information;

identifying, via the computing device, for each of the plurality of third-party RWEs, a respective plurality of third-party IOs associated with the respective third-party RWE, each of the respective third-party IOs comprising a plurality of third-party IO attributes;

retrieving social data, spatial data, temporal data and logical data available via the network associated with the target RWE, the first IO, and the plurality of third-part RWEs and the respective pluralities of third-party IOs associated with each of the plurality of third-part RWEs;

correlating, via the computing device, the first IO, the respective pluralities of third-party IOs and the social data, spatial data, temporal data and logical data to generate a probability score for each of the first IO and the respective pluralities of third-party IOs, the probability score representing a likelihood that attributes within the respective IO reflect correct information;

identifying, via the computing device, within a group of IOs comprising the first IO and each of the respective pluralities of third-party IOs, a most probable IO having the highest probability score within the group of IOs;

replacing, via the computing device, information in the each of first IO and the respective pluralities of third-party IOs using information in the most probable IO.

* * * * *